UNITED STATES PATENT OFFICE.

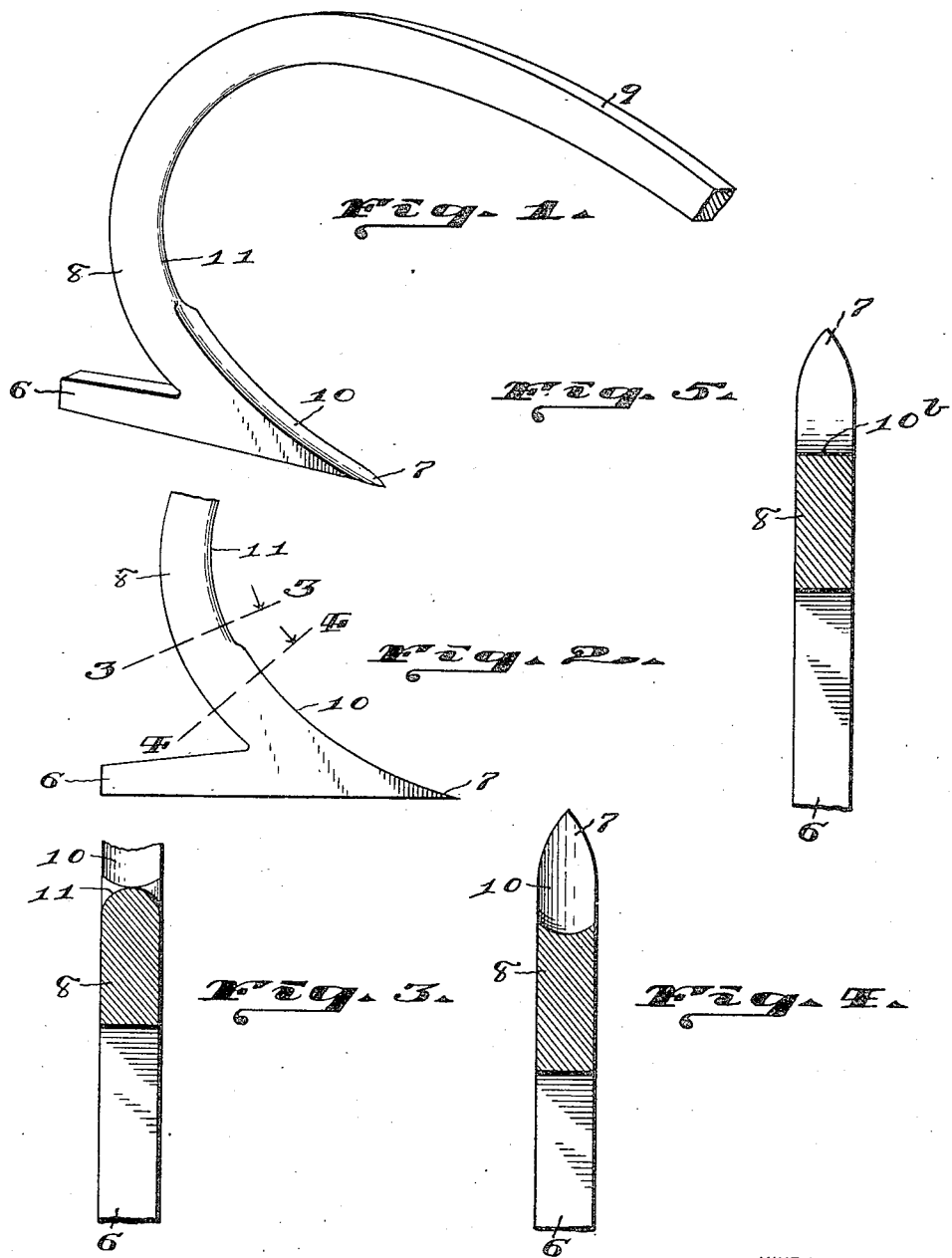

WILLIAM W. E. BOYER, OF OKLAHOMA, OKLAHOMA.

PLOW.

1,285,008.

Specification of Letters Patent.  Patented Nov. 19, 1918.

Application filed June 18, 1917. Serial No. 175,498.

*To all whom it may concern:*

Be it known that I, WILLIAM W. E. BOYER, a citizen of the United States, residing at Oklahoma, in the county of Oklahoma and State of Oklahoma, have invented certain new and useful Improvements in Plows, of which the following is a specification, reference being had to the accompanying drawings.

The invention pertains to plowing implements such as are used for cultivating.

An object of the invention is to provide a plow of this class more especially for deep cultivation.

Other objects and advantages of the invention will be set forth in the ensuing description.

Figure 1 is a perspective view of the improved plow.

Fig. 2 is a side elevation.

Fig. 3 is an enlarged sectional view taken on the line 3—3 of Fig. 2.

Fig. 4 is an enlarged sectional view taken on the line 4—4 of Fig. 2.

Fig. 5 is a reproduction of Fig. 4, but shows a different form of face on the front of the plow.

Like characters of reference designate like parts in all the figures.

The plow includes the usual horizontal portion 6, this portion being adapted to assist as usual in gaging the depth of the cut taken and to cause the plow to run more evenly.

From the front or pointed end 7 of the horizontal portion 6 a beam 8 extends integrally upward and rearward, the upper end of this beam portion being extended forward in the usual manner, as at 9, and adapted to be hitched to for pulling the plow.

For a considerable distance upward and rearward from the point 7, the beam portion 8 is provided with a laterally concaved upper face 10, and from the upper end of this concave face 10 on upward the beam portion is laterally convexed, as at 11.

With the plow arranged in this way, all the clay or other soil cut loose at the lowest depth by the lower or pointed end of the beam portion 8 will slide directly up the laterally-concaved face 10, thus allowing the plow to pull much easier than if the soil cut loose were crowded laterally into the sides of the furrow.

The clay or other soil brought up by and along the laterally concaved upper face 10 is spread outward into the loose upper soil by the dividing action of the laterally-convexed face 11 without adding materially to the draft of the plow.

Within the meaning and intent of the invention, the front face 10 may be formed straight laterally, as at 10$^b$ in Fig. 5, instead of concave.

Having thus described the invention, I claim:—

A plow consisting of a goose-necked beam, the front edge of its downward and forward curve to midway thereof being convex, below which the front edge is concave and terminates in a cutting point, there being a runner projecting rearwardly from said point with the lower edge of said runner in a horizontal plane and adapted to slide on the bottom of a furrow, all the parts being integral.

Witness my hand this 7 day of April, 1917.

WILLIAM W. E. BOYER.

Copies of this patent may be obtained for five cents each, by addressing the "Commissioner of Patents, Washington, D. C."